(12) United States Patent
Xu et al.

(10) Patent No.: US 11,399,411 B2
(45) Date of Patent: Jul. 26, 2022

(54) SIGNALING TRANSMISSION METHOD AND DEVICE, AND COMPUTER READABLE STORAGE MEDIUM

(71) Applicant: ZTE Corporation, Shenzhen (CN)

(72) Inventors: Hui Xu, Shenzhen (CN); Fang Xie, Shenzhen (CN); Zhongwei Ji, Shenzhen (CN); Jianfeng Ding, Shenzhen (CN); Yaying Wang, Shenzhen (CN); Xiaoquan Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/611,071

(22) PCT Filed: Nov. 13, 2017

(86) PCT No.: PCT/CN2017/110754
§ 371 (c)(1),
(2) Date: Nov. 5, 2019

(87) PCT Pub. No.: WO2018/201687
PCT Pub. Date: Nov. 8, 2018

(65) Prior Publication Data
US 2020/0170075 A1    May 28, 2020

(30) Foreign Application Priority Data

May 5, 2017    (CN) .......................... 201710313707.1

(51) Int. Cl.
*H04W 88/04*    (2009.01)
*H04B 7/155*    (2006.01)
(Continued)

(52) U.S. Cl.
CPC ............ *H04W 88/04* (2013.01); *H04B 7/155* (2013.01); *H04B 7/2606* (2013.01);
(Continued)

(58) Field of Classification Search
CPC ....................................................... H04B 7/155
See application file for complete search history.

(56) References Cited

U.S. PATENT DOCUMENTS 3,819,872 A * 6/1974 Hamrick ........... H04W 36/0069
455/423
8,681,814 B2 * 3/2014 Hart ...................... H04L 47/724
370/468
(Continued)

FOREIGN PATENT DOCUMENTS

CN    101820680 A    9/2010
CN    102469410 A    5/2012
(Continued)

OTHER PUBLICATIONS

International Search Report for corresponding application PCT/CN2017/110754 filed Nov. 13, 2017; dated Jan. 26, 2018.
(Continued)

*Primary Examiner* — Andrew C Oh
(74) *Attorney, Agent, or Firm* — Cantor Colburn LLP (57) ABSTRACT

Disclosed are a signaling transmission method and device, and a computer readable storage medium. The method includes: a Relay-UE receives signaling sent by a base station or a Remote-UE; and if the Relay-UE determines that a signal forwarding condition is satisfied or if the Relay-UE receives a signal forwarding instruction message sent by the base station, the Relay-UE forwards the signaling between the Remote-UE and the base station.

14 Claims, 6 Drawing Sheets

(51) Int. Cl.
　　　*H04B 7/26* (2006.01)
　　　*H04W 16/26* (2009.01)
　　　*H04W 72/04* (2009.01)
　　　*H04W 84/04* (2009.01)
　　　*H04L 1/00* (2006.01)

(52) U.S. Cl.
　　　CPC ......... *H04W 16/26* (2013.01); *H04W 72/042* (2013.01); *H04W 84/047* (2013.01); *H04L 2001/0097* (2013.01)

(56) References Cited

U.S. PATENT DOCUMENTS

| | | | | |
|---|---|---|---|---|
| 9,532,396 | B2* | 12/2016 | Kalapatapu | H04W 76/14 |
| 9,584,985 | B2* | 2/2017 | Wu | H04W 4/80 |
| 10,009,142 | B1* | 6/2018 | Velusamy | H04B 7/15528 |
| 10,039,138 | B2* | 7/2018 | Lecroart | H04L 69/322 |
| 10,075,217 | B1* | 9/2018 | Sung | H04B 7/15507 |
| 10,149,207 | B1* | 12/2018 | Oroskar | H04W 36/24 |
| 10,182,425 | B2* | 1/2019 | Morioka | H04W 40/08 |
| 10,205,507 | B2* | 2/2019 | Madaiah | H04B 7/15528 |
| 10,313,242 | B2* | 6/2019 | Yang | H04L 47/10 |
| 10,448,441 | B2* | 10/2019 | Yi | H04L 1/18 |
| 10,477,608 | B2* | 11/2019 | Tenny | H04W 4/18 |
| 2003/0196105 | A1* | 10/2003 | Fineberg | H04L 63/08 |
| | | | | 713/168 |
| 2004/0100986 | A1* | 5/2004 | Lee | H04L 12/4035 |
| | | | | 370/461 |
| 2004/0121766 | A1* | 6/2004 | Benson | H04W 76/14 |
| | | | | 455/425 |
| 2004/0242154 | A1* | 12/2004 | Takeda | H04W 52/46 |
| | | | | 455/16 |
| 2007/0133455 | A1* | 6/2007 | Kuchibhotla | H04W 76/14 |
| | | | | 370/312 |
| 2008/0009241 | A1* | 1/2008 | Do | H04B 7/155 |
| | | | | 455/9 |
| 2008/0108369 | A1* | 5/2008 | Visotsky | H04W 72/085 |
| | | | | 455/455 |
| 2010/0103862 | A1* | 4/2010 | Ulupinar | H04L 69/04 |
| | | | | 370/315 |
| 2010/0120439 | A1* | 5/2010 | Hashimoto | H04W 36/32 |
| | | | | 455/445 |
| 2010/0260129 | A1* | 10/2010 | Ulupinar | H04L 12/4633 |
| | | | | 370/329 |
| 2011/0194483 | A1* | 8/2011 | Ji | H04W 36/0033 |
| | | | | 370/315 |
| 2012/0113884 | A1* | 5/2012 | Park | H04L 5/0094 |
| | | | | 370/312 |
| 2012/0147831 | A1* | 6/2012 | Golitschek | H04L 5/001 |
| | | | | 370/329 |
| 2012/0170508 | A1* | 7/2012 | Sawai | H04B 7/155 |
| | | | | 370/315 |
| 2012/0309291 | A1* | 12/2012 | Sawai | H04B 7/15542 |
| | | | | 455/7 |
| 2012/0314569 | A1* | 12/2012 | Liu | H04W 36/30 |
| | | | | 370/252 |
| 2013/0003586 | A1* | 1/2013 | Tajima | H04W 48/20 |
| | | | | 370/252 |
| 2013/0016649 | A1* | 1/2013 | Damnjanovic | H04W 88/04 |
| | | | | 370/315 |
| 2013/0022025 | A1* | 1/2013 | Watanabe | H04W 36/00835 |
| | | | | 370/332 |
| 2013/0229942 | A1* | 9/2013 | Kubota | H04W 36/22 |
| | | | | 370/252 |
| 2013/0324130 | A1* | 12/2013 | Maruta | H04W 36/16 |
| | | | | 455/436 |
| 2013/0331093 | A1* | 12/2013 | Cho | H04W 88/04 |
| | | | | 455/7 |
| 2014/0192638 | A1* | 7/2014 | Taneja | H04W 28/0268 |
| | | | | 370/229 |
| 2014/0286230 | A1* | 9/2014 | Hirata | H04W 40/12 |
| | | | | 370/315 |
| 2015/0029866 | A1* | 1/2015 | Liao | H04W 48/14 |
| | | | | 370/241 |
| 2015/0045033 | A1* | 2/2015 | Kim | H04B 7/15507 |
| | | | | 455/11.1 |
| 2015/0271856 | A1* | 9/2015 | Tong | H04W 16/26 |
| | | | | 455/552.1 |
| 2015/0382277 | A1* | 12/2015 | Ljung | H04W 40/22 |
| | | | | 455/445 |
| 2016/0192439 | A1* | 6/2016 | Phuyal | H04L 1/08 |
| | | | | 370/315 |
| 2016/0212682 | A1* | 7/2016 | Chung | H04W 12/06 |
| 2016/0249390 | A1* | 8/2016 | Hans | H04W 68/02 |
| 2016/0286471 | A1* | 9/2016 | Zisimopoulos | H04L 12/185 |
| 2016/0338094 | A1* | 11/2016 | Faurie | H04W 72/14 |
| 2016/0338095 | A1* | 11/2016 | Faurie | H04W 72/1278 |
| 2017/0012750 | A1* | 1/2017 | Chen | H04B 17/345 |
| 2017/0055282 | A1* | 2/2017 | Sadiq | H04W 88/04 |
| 2017/0071028 | A1* | 3/2017 | Kuo | H04W 8/06 |
| 2017/0111754 | A1* | 4/2017 | Baghel | H04W 12/062 |
| 2017/0230941 | A1* | 8/2017 | Agiwal | H04W 40/22 |
| 2017/0273119 | A1* | 9/2017 | Li | H04W 12/03 |
| 2017/0325270 | A1* | 11/2017 | Tenny | H04W 76/14 |
| 2018/0092017 | A1* | 3/2018 | Freda | H04B 7/155 |
| 2018/0092022 | A1* | 3/2018 | Huang | H04W 74/0833 |
| 2018/0109985 | A1* | 4/2018 | Huang | H04W 36/30 |
| 2018/0152986 | A1* | 5/2018 | Jung | H04W 76/30 |
| 2018/0175929 | A1* | 6/2018 | Wang | H04B 7/14 |
| 2018/0295497 | A1* | 10/2018 | Kim | H04W 60/04 |
| 2019/0028962 | A1* | 1/2019 | Chun | H04W 8/24 |
| 2019/0124651 | A1* | 4/2019 | Xu | H04W 76/20 |
| 2019/0357177 | A1* | 11/2019 | Kuang | H04W 76/27 |
| 2021/0105066 | A1* | 4/2021 | Uchiyama | H04W 24/10 |
| 2021/0289529 | A1* | 9/2021 | Hosseini | H04L 1/0026 |

FOREIGN PATENT DOCUMENTS

| | | |
|---|---|---|
| CN | 105657783 A | 6/2016 |
| CN | 105657838 A | 6/2016 |
| CN | 105846882 A | 8/2016 |
| CN | 106454752 A | 2/2017 |

OTHER PUBLICATIONS

Chinese Office Action for corresponding application 201710313707; Report dated Sep. 3, 2021.

Chinese Search Report for corresponding application 201710313707; Report dated Sep. 3, 2021.

* cited by examiner

SIGNALING TRANSMISSION METHOD AND DEVICE, AND COMPUTER READABLE STORAGE MEDIUM

CROSS-REFERENCE TO RELATED APPLICATIONS

This is a National Stage Application, filed under 35 U.S.C. 371, of International Patent Application No. PCT/CN2017/110754, filed on Nov. 13, 2017, which claims priority to Chinese patent application No. 201710313707.1 filed on May 5, 2017, contents of both of which are incorporated herein by reference in their entireties.

TECHNICAL FIELD

The present application relates to the technical field of communications, and in particular to a signaling transmission method and device, and a computer readable storage medium.

BACKGROUND

With the development of wireless multimedia service, there is an increasing demand for high data rates and user experiences, thereby presenting a higher requirement on the system capacity and coverage of a traditional cellular network. On the other hand, application scenarios such as public safety, social network, short-range data sharing and local advertising lead to an increasing demand for knowing about and communicating with nearby people or things (Proximity Services). A traditional base station-centric cellular network has significant limitations in terms of the high data rates and support to the proximity services. In the context of this demand, a D2D (Device-to-Device) technology, which represents a new direction for the future development of communication technology, has emerged. The application of the D2D technology can reduce the burden of the cellular network, reduce the battery power consumption of a user equipment (UE), improve the data rates, improve the robustness of a network infrastructure, and well satisfy the requirements of a high data rate service and the proximity services described above. Currently, the D2D technology is also called the Proximity Services (ProSe), or a Sidelink (SL).

The D2D technology generally includes a D2D discovery technology and a D2D communication technology. The D2D discovery technology refers to a technology for judging or determining whether a first UE is adjacent to a second UE. In general, a D2D UE may discover another D2D UE by sending or receiving discovery signals or information. The D2D communication technology refers to a technology in which part or all of communication data may be directly communicated between the D2D UEs, instead of through the network infrastructure.

However, it is still unknown how to implement the signaling transmission between the D2D UEs.

SUMMARY

Embodiments of the present application provide a signaling transmission method and device, and a computer readable storage medium.

The embodiments of the present application is to provide a signaling transmission method, the method includes:
 a Relay-UE receives signaling sent by a base station or a Remote-UE; and
 if the Relay-UE determines that a signal forwarding condition is satisfied or if the Relay-UE receives a signal forwarding instruction message sent by the base station, the Relay-UE forwards the signaling between the Remote-UE and the base station.

The embodiments of the present application is to provide a signaling transmission device, the signaling transmission device includes a processor, a memory and a communication bus,
 the communication bus is configured to implement connection and communication between the processor and the memory,
 the processor is configured to execute a signaling transmission program stored in the memory to implement steps of:
  signaling sent by a base station or a Remote-UE is received; and
  if it is determined that a signaling forwarding condition is satisfied or if a signaling forwarding instruction message sent by the base station is received, the signaling between the Remote-UE and the base station is forwarded.

The embodiments of the present application is to provide a computer readable storage medium storing one or more programs, the one or more programs are executable by one or more processors to implement steps of:
 signaling sent by a base station or a Remote-UE is received; and
 if it is determined that a signaling forwarding condition is satisfied or if a signaling forwarding instruction message sent by the base station is received, the signaling between the Remote-UE and the base station is forwarded.

A signaling transmission method and device, and a computer readable storage medium are provided. According to the embodiments of the present application, the Remote-UE communicates with a network through the Relay-UE or communicates directly with the network, when the Remote-UE is located out of a coverage of the network, the Remote-UE can be ensured to receive network signaling, and operations related to the network are ensured.

DETAILED DESCRIPTION

With the development of the universal Internet demand, 3GPP standardizes Machine Type Communication (MTC), eMTC work of R12 and R13 has been substantially completed, and standardization work of Narrow Band-Internet of Things (NB-IoT) is currently still performed. Where R13 eMTC increases a coverage enhanced support and a bandwidth limited support on the basis of low cost. Generally, transmit-receive radio frequency capability of an eMTC user equipment (UE) is limited to 1.4 MHz, while a radio frequency transmit-receive bandwidth of an NB-IoT equipment is limited to 180 kHz. A coverage enhancement is usually achieved by multiple repetitions of data transmission between an evolved Node B (eNB) and an eMTC/NB-IoT UE. In view of the low cost characteristic of an eMTC/NB-IoT equipment, it is generally desirable to prolong service life of the eMTC/NB-IoT equipment as much as possible, however, the coverage enhancement may cause multiple repeated transmissions of a data packet, thereby quickly consuming power of the UE. In addition to eMTC and NB-IoT equipment, wearable equipments also have similar application requirements, such as low cost, limited bandwidth, low power consumption, etc.

Figure 1:
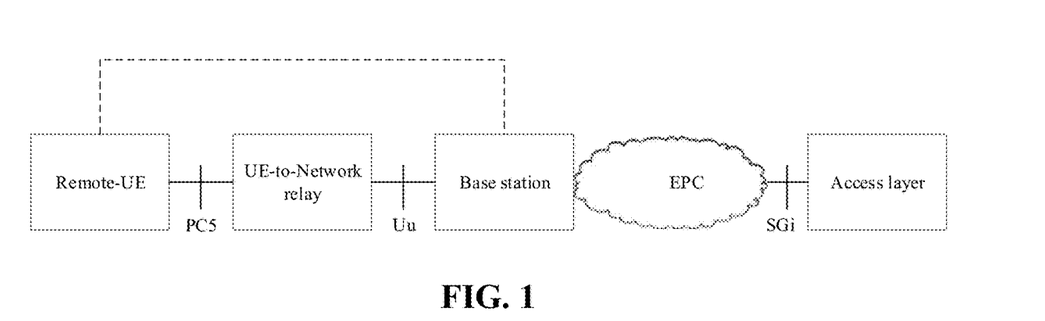
FIG. 1 is a schematic diagram of a communication architecture adopting a UE-to-network relay.

The topic Of 3GPP's new project includes an enhanced D2D, which is mainly directed to wearable equipments (Wearables) and Internet Of Thing (IOT)/MTC applications, where the Wearables implement communication with a network through a UE-to-network relay (user equipment to network relay), where Wearables UE may communicate via a PC5 or a Uu interface in a coverage of the eNB, and at least an uplink data adopts the PC5. A communication architecture adopting the UE-to-network relay is shown in FIG. 1.

Wearables/IOT/MTC (hereinafter referred to as Relat-UE) communicates with the network through a relay user equipment (hereinafter referred to as Relay-UE) or directly communicates with the network, and when a Remote-UE is located out of the coverage of the network, the Remote-UE may not directly receive network signaling, which may cause network-related operations to fail.

In order to guarantee the service of the Remote-UE, it is required to implement signaling transmission between the Remote-UE and the Relay-UE.

Figure 2:
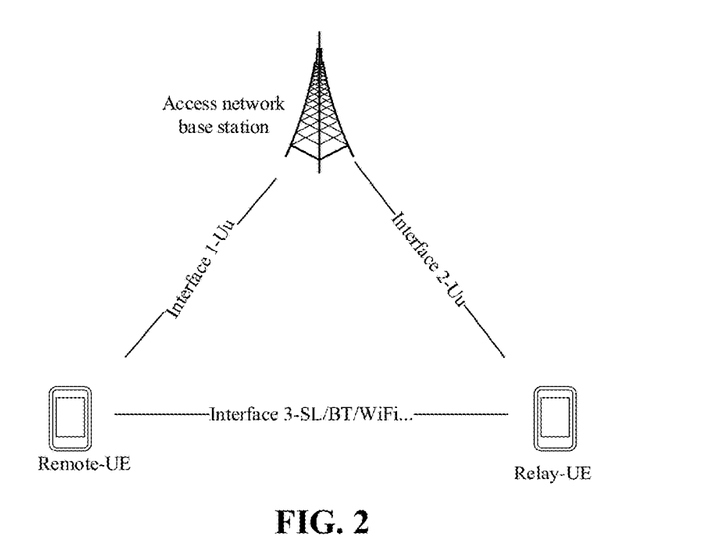
FIG. 2 is a schematic diagram of a system architecture to which a signaling transmission method according to an embodiment of the present application is applied.

Referring to FIG. 2, a schematic diagram of a system architecture to which a signaling transmission method according to an embodiment of the present application is applied is shown. The system architecture of the embodiment of the present application includes a Remote-UE device, a Relay-UE device and an access network device. As can be seen from FIG. 2, the Remote-UE in FIG. 2 may communicate with the access network device through an interface 1 or an interface 3 (and interface 2). The interface 1 and the interface 3 may be of the same frequency or different frequencies, and the interface 3 adopts a licensed frequency spectrum or an unlicensed frequency spectrum. The communication technology adopted by the interface 3 includes one of: a 3GPP technology or a non-3GPP technology. Where the 3GPP technology includes sidelink communication, the non-3GPP technology includes one of: bluetooth, wireless local area network (WLAN), infrared point-to-point communication technology (IrDA), or ZigBee protocol. The Relay-UE is at least one of UE-to-network relay.

The signaling transmission method based on the system architecture shown in FIG. 2 in the embodiment of the present application is described in detail below.

Figure 3:
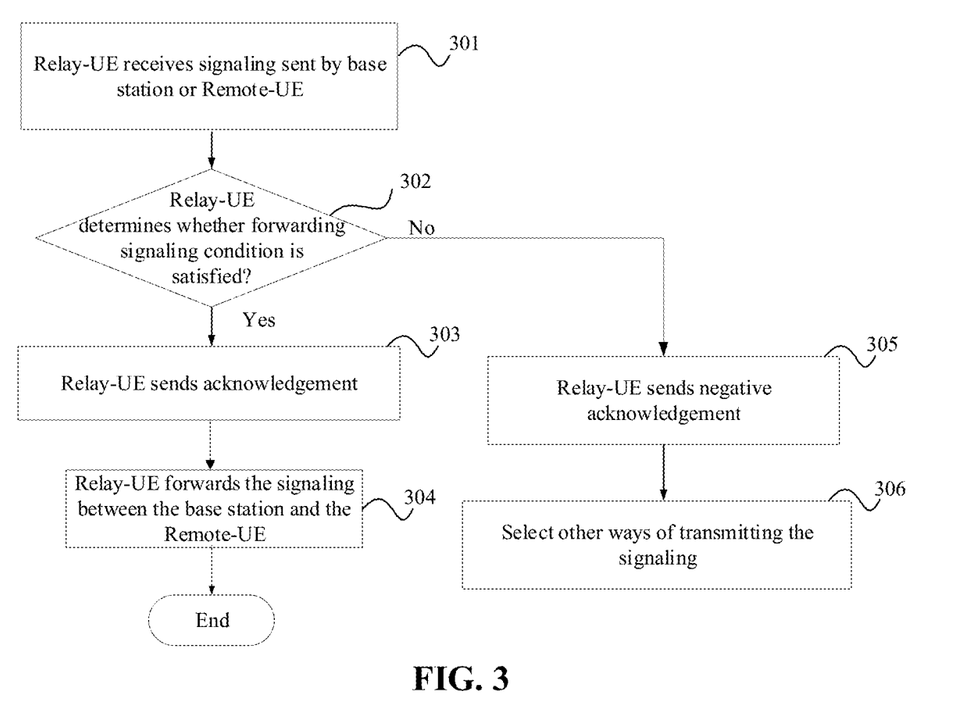
FIG. 3 is a flowchart of a signaling transmission method according to an embodiment of the present application.

Referring to FIG. 3, a flow chart of a signaling transmission method according to the embodiment of the present application is shown. The signaling transmission method includes:

In step 301, the Relay-UE receives signaling sent by a base station or a Remote-UE.

In step 302, the Relay-UE determines whether a signaling forwarding condition is satisfied, if yes, the process turns to step 303, otherwise, the process turns to step 305.

Moreover, after the Relay-UE receives a signaling forwarding instruction message sent by the base station, step 303 may also be performed.

The signaling forwarding instruction message is sent by the base station through dedicated Radio Resource Control (RRC) signaling, the Relay-UE is associated with multiple Remote-UEs in advance, and the association relationship between the Relay-UE and the Remote-UE is known by the base station. If the base station sends the signaling forwarding instruction message, the Relay-UE is in a RRC-connected state, and if the Remote-UE sends the signaling forwarding instruction message, the Remote-UE has established a connection with the Relay-UE.

The signaling forwarding instruction message at least includes a Remote-UE identifier.

In this embodiment, the signaling forwarding instruction message further includes at least one of following information: a Remote-UE identifier, a type of signaling to be forwarded, signaling sending time, a signaling forwarding mode, a forwarding resource, or signaling contents.

The Relay-UE determines signaling contents to be forwarded, where the signaling to be forwarded is one of: all of the signaling received by the Relay-UE, or part of the signaling received by the Relay-UE; and the Relay-UE converts the signaling received via the Uu interface into signaling suitable for transmission via a sidelink interface, or converts the signaling received via the sidelink interface into signaling suitable for transmission via the Uu interface.

Where the type of signaling includes a system message, a paging message, a response message, a synchronizing signal and a request message, etc; the signaling sending time refers to time for sending signaling to be forwarded, namely time for receiving the signaling by the Relay-UE; the signaling forwarding mode includes at least one of: signaling of layer 1, signaling of layer 2, signaling of layer 3, periodic forwarding, aperiodic forwarding, merging and forwarding, or segmenting and forwarding, etc; the forwarding resource is a position of the signaling to be forwarded, when a signaling forwarding request message comes from the base station, the position of the forwarding resource is indicated by the base station; and when the signaling forwarding request message comes from the Remote-UE, the forwarding resource is determined in one of: a pre-configured resource, a resource configured by the Relay-UE, or a resource configured by the base station; for example, if the Remote-UE is located out of the coverage of the base station, the pre-configured resource or the resource configured by the Relay-UE is adopted; when the Remote-UE is located in the coverage of the base station, the resource configured by the Relay-UE or the resource configured by the base station may be adopted If the signaling forwarding request message comes from the Remote-UE, the Relay-UE determines whether the signaling forwarding condition is satisfied according to at least one of following information: whether the network parameter satisfies a preset condition, whether a pre-configured rule is satisfied, or whether access network indication information is received;

where the network parameter includes a link quality and a quality of service (QoS) requirement.

For example, if the quality of a Uu link (between the Remote-UE and the base station) is lower than a pre-configured threshold, or the link (between the Remote-UE and the base station) does not satisfy the QoS required by the service, or the forwarding condition indicated by the pre-configured rule is satisfied, or the access network instruct the Relay-UE to forward, the Relay-UE may determine the signaling forwarding, otherwise the Relay-UE may reject the signaling forwarding.

The access network indication information refers to information sent by an access network device to the Remote-UE via a system message or dedicated signaling and used for indicating at least one of a communication path or a communication technology, where the dedicated signaling includes at least one of: signaling of layer 1, signaling of layer 2 or signaling of layer 3. Further, the access network indication information further includes at least one of: communication via at least one of the Uu interface or the sidelink interface, type of service (ToS) of the communication via each of the Uu interface and the sidelink interface, priorities of the Uu interface and the sidelink interface, discovery of the sidelink interface and/or a communication resource for the side interface, or use of 3GPP or non-3GPP technology for the sidelink interface; where the ToS includes one of: QoS, a control plane service, a user plane service, a uplink or downlink service.

If the signaling comes from the base station, the Relay-UE determines whether to forward the signaling according to at least one of following information: whether a network parameter satisfies a preset condition, or a pre-configuring rule.

The network parameter includes a link quality and a QoS requirement.

It should be noted that the Relay-UE may directly receive the request message from the base station, namely, the Relay-UE directly sends a confirmation message to the base station and forwards the signaling between the Remote-UE and the base station without determining.

As an embodiment, the Relay-UE may be associated with multiple Remote-UEs, and the Remote-UE may also be associated with multiple Relay-UEs, where an association relationship between the Remote-UE and the Relay-UE may be configured by a higher level, and is delivered to the Remote-UE, the Relay-UE and the base station related to the association relationship in advance. Thus, The Relay-UE for signaling forwarding may be selected from the multiple Relay-UEs. In an embodiment, one Relay-UE may also be implemented to forward the signaling of the associated multiple Remote UEs.

In step 303, the Relay-UE sends an acknowledgement:

if the Relay-UE determines that the signaling may be forwarded, the Relay-UE sends an acknowledgement message to the base station or the Remote-UE. The acknowledgement message includes at least one of: a forwarding mode, a forwarding resource or a Remote-UE identifier; where the forwarding mode refers to one of: signaling forwarding (such as signaling of layer 1, signaling of layer 2 or signaling of layer 3), a forwarding cycle, merging and forwarding (merging multiple signaling into one signaling), segmenting and forwarding (segmenting one signaling into multiple signaling), complete forwarding (all of the received signaling is forwarded), or partial forwarding (part of the received signaling is forwarded); the forwarding resource refers to a position for the signaling forwarding; and the Remote-UE identifier is used for indicating the Remote-UE involved in the signaling forwarding.

In step 304, the Relay-UE forwards the signaling between the base station and the Remote-UE, and the process is ended:

specifically, the Relay-UE receives the signaling from the Remote-UE via the sidelink interface and then forwards the signaling to the base station via the Uu interface; and/or the Relay-UE receives the signaling from the base station via the Uu interface and then forwards the signaling to the Remote-UE. The Relay-UE firstly determines the signaling to be forwarded, and then forwards the above signaling when the destination address of the received signaling is not local.

It should be noted that when the Relay-UE receives the signaling forwarding request message from the base station, before forwarding the signaling by the Relay-UE, the method further includes the Remote-UE is informed of relevant information of signaling forwarding, such as forwarding time, a forwarding resource, etc.

As an embodiment, when the Remote-UE is located in the coverage of the base station, (before being forwarded, the Relay-UE and the Remote-UE need to be linked in a pairing manner, and the position of the Remote-UE may be determined through interaction.), the Relay-UE may also forward part of the signaling (part of the signaling being forwarded may be indicated by the base station, or may be determined by the Relay-UE itself), and the remaining signaling is directly transmitted by the Remote-UE and the base station.

In step 305, the Relay-UE sends a negative acknowledgement:

if the Relay-UE rejects to forward the signaling, a negative acknowledgement message is sent to the base station or the Remote-UE, where the negative acknowledgement includes a reason for rejection.

In step 306, other ways of transmitting the signaling are selected:

another Relay-UE is selected by the Remote-UE or the base station to forward the signaling, or signaling interaction of the Remote-UE and the base station is directly performed, or the signaling interaction between the Remote-UE and the base station is suspended.

It can be seen that, in the embodiment of the present application, the Relay-UE receives the signaling forwarding request message from the Remote-UE or the base station, and directly sends the response message or sends the response message if it is determined that the forwarding condition is satisfied; and after the Relay-UE sends the response message, the Relay-UE monitors and receives the signaling sent by at least one of the base station or the Remote-UE, and the Relay-UE performs corresponding processing on the signaling according to a preset rule and then forwards the signaling to a target node.

the Remote-UE is located in or out of a coverage of the access network, or the Remote-UE is located in an enhanced coverage. The Remote-UE receives control signaling such as a system message, a synchronization signal, a paging message, a measurement configuration, etc sent by an access network via the sidelink interface, and sends control signaling such as a request message, a response message, a measurement report, etc for the access network via the sidelink interface. In the embodiment of the present application, in order to save the power consumption, the uplink user plane data of the Remote-UE may be transmitted through the Relay-UE.

The Remote-UE may autonomously select the interface 1 or the interface 3 (and the interface 2) in FIG. 2 according to a pre-configured rule so as to communicate with the access network. Where the pre-configured rule is stored in a Universal Integrated Circuit Card (UICC) or a Mobility Device (ME) of the UE; and the autonomous selection means that if both interfaces may communicate and the base station has no instruction, one of the interfaces is selected to communicate according to the rule and the current link condition.

Figure 4A:
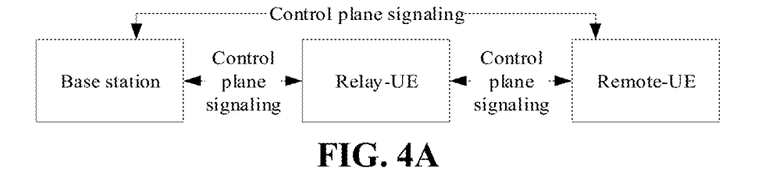
FIG. 4A is a schematic diagram of a relay user equipment (Relay-UE) performing a partial signaling transmission by using a signaling transmission method according to an embodiment of the present application.
Figure 4B:
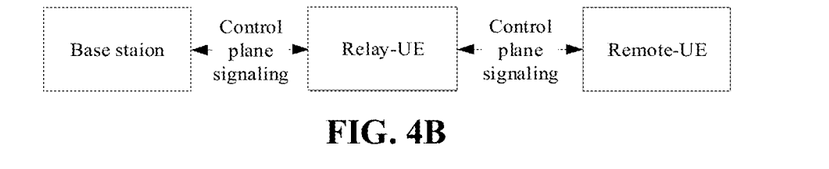
FIG. 4B is a schematic diagram of implementing that all of signaling at a Uu interface disposed between a base station and a Remote-UE is forwarded by the Relay-UE by means of adopting a signaling transmission method according to an embodiment of the present application.

FIG. 4A and FIG. 4B are schematic diagrams showing the results of preforming the signaling transmission by using the signaling transmission method according to the embodiment of the present application. In FIG. 4A, the Remote-UE is located in the coverage of an access network base station, and part of the control signaling such as a system message is transmitted via the Uu interface between the access network and the Remote-UE, and other control signaling such as a paging message is forwarded through the Relay-UE. In FIG. 4B, the Remote-UE is located in or out of the coverage of the access network base station, and the Uu interface signaling between the base station and the Remote-UE is forwarded through the Relay-UE, such as a system message, a paging message, synchronization signals, etc.

The Remote-UE determines based on one of: the network parameter, a pre-configured rule or access network indication information, to determine the required communication path. The network parameter includes a link quality and a QoS requirement.

The pre-configured rule include at least one of: a priority or a threshold, where the priority refers to priority between the interface 1 and the interface 3, and if the priority of the interface 1 is high, the interface 1 is preferentially selected; the threshold refers to the link quality requirement of at least one of the interface 1 or the interface 3, if the link quality of the current interface is lower than the specified threshold, the UE selects other interfaces or other communication technologies to continue communication, and if the UE selects other interfaces or other communication technologies, the UE notifies the access network device. As an embodiment, the pre-configured rule further includes a resource configuration.

The present application is exemplarily described by examples in specific application below.

A First Application Example

Figure 5:
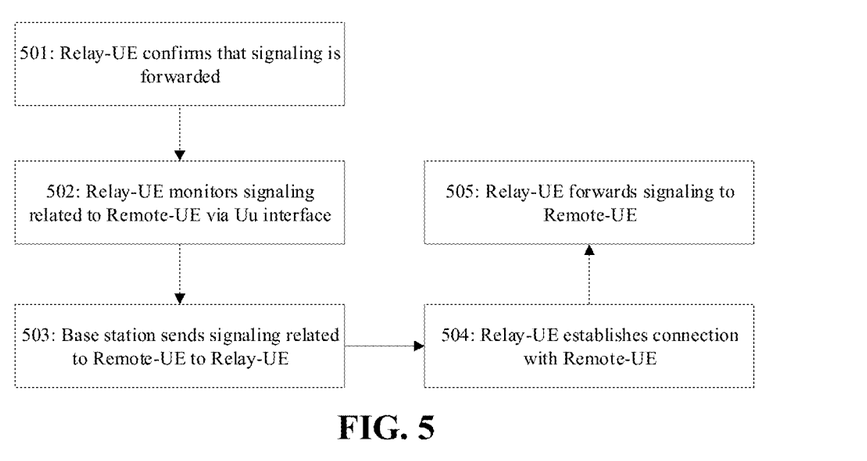
FIG. 5 is a schematic diagram of a signaling forwarding process according to a first application example of the present application.

Referring to FIG. 5, a schematic diagram of a signaling forwarding process according to a first application example of the present application is shown. In this application example, the Relay-UE receives a signaling forwarding request message from the base station or the Remote-UE, where the signaling forwarding request message requests to forward the signaling from the base station to the Remote-UE, and the Relay-UE processes according to the request, which specifically includes:

In step 501, the Relay-UE confirms that the signaling between the base station and the Remote-UE is forwarded:

the Relay-UE receives the request message from the base station or the Remote-UE, the Relay-UE agrees to forward the signaling from the base station to the Remote-UE, and sends a confirmation message to the base station or the Remote-UE, where the confirmation message is carried by using RRC signaling. The signaling includes one of: a system message, a paging message, a synchronization signal, a measurement configuration, or a resource scheduling, etc.

In step 502, the Relay-UE monitors the signaling related to the Remote-UE:

the Relay-UE monitors the signaling related to the Remote-UE via the Uu interface, the Relay-UE monitors according to the identifier of the Remote-UE, the Relay-UE and the Remote-UE are associated with each other, namely the Remote-UE may receive and transmit the signaling from the base station through the Relay-UE. For example, for the paging message, the Relay-UE also monitors the paging message of the Remote-UE in addition to monitoring the paging message of the Relay-UE itself, i.e, reads the paging message at a corresponding paging time of the Remote-UE, and determines whether there is a paging record for the Remote-UE.

In step 503, the base station sends signaling related to the Remote-UE to the Relay-UE:

the base station sends signaling related to Remote-UE via the Uu interface, and the Relay-UE receives the signaling. After receiving the signaling, the Relay-UE determines a signaling forwarding mode according to at least one of a type of signaling, signaling contents or a base station instruction.

In step 504, the Relay-UE establishes a connection with the Remote-UE:

if the Relay-UE does not establish a connection with the Remote-UE, and then the Relay-UE establishes a sidelink connection with the Remote-UE, otherwise, the process directly goes to step 505, where the connection refers to the signaling connection between the Relay-UE and the Remote-UE. The Relay-UE may establish a connection with the Remote-UE through a discovery process. if the Relay-UE sends a notification message that instructs the Remote-UE to be connected, the Remote-UE initiates a connection establishment process with the Relay-UE after receiving the notification message.

In step 505, the Relay-UE forwards the signaling to the Remote-UE:

the Relay-UE forwards the signaling received via the Uu interface to the Remote-UE through sidelink signaling. Further, after the Remote-UE receives the signaling forwarding, the Remote-UE sends a response message to the base station through the Relay-UE, for example the Relay-UE forwards a paging message to the Remote-UE, the Remote-UE initiates an RRC connection establishment request to the base station through the Relay-UE after receiving the paging message, the Remote-UE firstly establishes a sidelink user plane connection with the Relay-UE, and the Relay-UE in turn establishes a corresponding Uu interface user plane connection with the base station; further, one network side connection, such as a Packet Data Network (PDN) connection may correspond to multiple sidelink connections (for multiple Remote-UEs). In one PDN connection, different sidelink connections are distinguished by different identifier.

A Second Application Example

Figure 6:
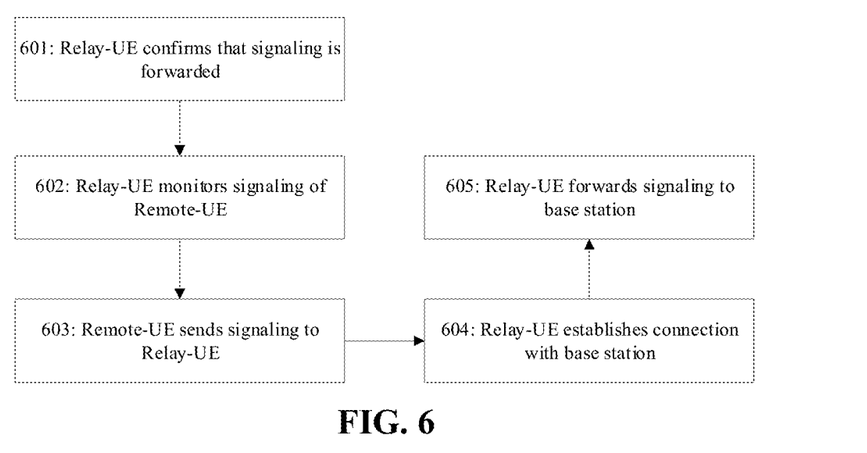
FIG. 6 is a schematic diagram of a signaling forwarding process according to a second application example of the present application.

Referring to FIG. 6, a schematic diagram of a signaling forwarding process of a second application example of the present application is shown. In this application example, the Relay-UE receives a signaling forwarding request message from the base station or the Remote-UE, where the signaling forwarding request message requests to forward a signaling from the Remote-UE to the base station, and the Relay-UE processes according to the request, which specifically includes:

In step 601, the Relay-UE confirms that the signaling from the Remote-UE to the base station is forwarded:

the Relay-UE receives the request message from the base station or the Remote-UE, the Relay-UE agrees to forward the signaling from the Remote-UE to the base station, and sends a confirmation message to the base station or the Remote-UE, where the confirmation message is carried by using RRC signaling. The signaling includes at least one of: a measurement report, a connection or resource request message, or a response message, etc.

In step 602, the Relay-UE monitors the signaling of the Remote-UE:

The Relay-UE monitors the signaling from the Remote-UE to the base station via the sidelink interface, and the Relay-UE and the Remote-UE has established a signaling connection.

In step 603, the Remote-UE sends signaling related to the base station to the Relay-UE:

the Remote-UE sends signaling to the base station through the Relay-UE, the Relay-UE determines the base station to which the signaling is directed according to the signaling contents, and the Relay-UE determines a signaling forwarding mode according to one or more of following information: a type of signaling, signaling contents or a base station instruction.

In step 604, the Relay-UE establishes a connection with the base station:

if the Relay-UE is in a RRC-Idle Idle state, the Relay-UE establishes an RRC connection with the base station, otherwise, the progress directly goes to step 605; further, when the Relay-UE requests to establish the RRC connection, the reason for the request may be set as: remote Mobile Originated (MO) signaling, or relay MO signaling.

In step 605, the Relay-UE forwards the signaling:

the Relay-UE forwards the signaling to the base station via the Uu interface.

A Third Application Example

Figure 7:
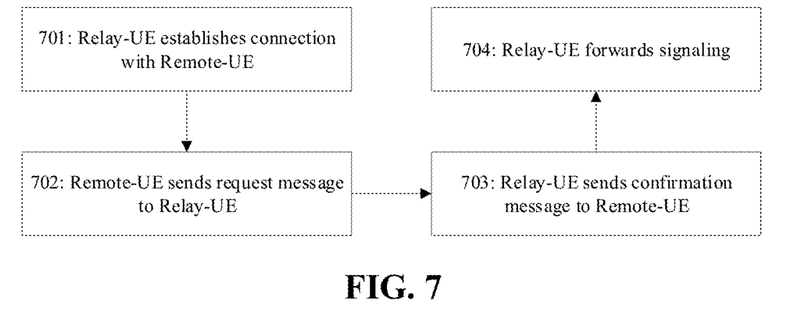
FIG. 7 is a schematic diagram of a signaling forwarding process according to a third application example of the present application.

Referring to FIG. 7, a schematic diagram of a signaling forwarding process of a third application example of the present application is shown. In this application example, the Relay-UE receives a signaling forwarding request message from the Remote-UE, where the signaling forwarding request message requests to forward signaling from the Remote-UE to the base station and/or signaling from the base station to the Remote-UE, the Relay-UE processes according to the request, which specifically includes:

In step 701, a connection between the Remote-UE and the Relay-UE is established:

the Remote-UE establishes a signaling connection with the Relay-UE, the Remote-UE may establish a signaling connection with the Relay-UE through a discovery process, and when the Remote-UE sends a request message and indicates a Relay-UE identifier in the request message, the Relay-UE receiving the request establishes a connection with the Remote-UE.

In step 702, the Remote-UE sends a request message to the Relay-UE:

the Remote-UE sends a request message to the Relay-UE through the sidelink interface, where the request message includes at least one of following information: a type of signaling to be forwarded, signaling contents to be forwarded, a signaling forwarding mode, or a position of a signaling resource to be forwarded. Where the signaling includes at least one of: signaling from the Remote-UE to the base station, or signaling from the base station to the Remote-UE.

In step 703, the Relay-UE sends a confirmation response message to the Remote-UE:

the Relay-UE sends a confirmation response message to the Remote-UE through sidelink signaling, where the response message at least includes one of: forwarding mode or forwarding resource.

In step 704, the Relay-UE forwards the signaling:

the Relay-UE monitors and receives signaling from the Remote-UE and forwards the signaling to the base station, or the Relay-UE monitors and receives signaling from the base station and forwards the signaling to the Remote-UE.

In the signaling forwarding, the source of the signaling, such as the source from the Remote-UE or the base station, needs to be instructed to implement the correct processing of the signaling by the recipient.

A Fourth Application Example

Figure 8:
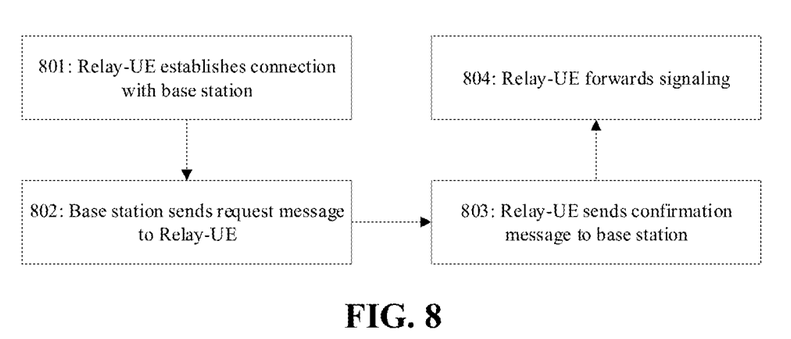
FIG. 8 is a schematic diagram of a signaling forwarding process according to a fourth application example of the present application.

Referring to FIG. 8, a schematic diagram of a signaling forwarding process of a fourth application example of the present application is shown. In this application example, the Relay-UE receives a signaling forwarding request message from the base station, where the signaling forwarding request message requests to forward signaling from the Remote-UE to the base station and/or signaling from the base station to the Remote-UE, the Relay-UE processes according to the request, which specifically includes:

In step 801, the Relay-UE establishes a connection with the base station:

the Relay-UE establishes a RRC connection with the base station.

In step 802, the base station requests the Relay-UE to forward the signaling:

the base station requests the Relay-UE to forward the signaling through RRC signaling, and the request message includes at least one of following information: a type of the signaling to be forwarded, signaling contents to be forwarded, a signaling forwarding mode, a position of a signaling resource to be forwarded, or a resource used for forwarding the signaling, etc. Where the signaling includes at least one of: signaling from the Remote-UE to the base station, or signaling from the base station to the Remote-UE.

In step 803, the Relay-UE sends a confirmation message to the base station:

the Relay-UE sends a confirmation response message to the base station via the Uu interface through the RRC signaling, where the response message includes one of: a forwarding mode or a forwarding resource.

In step 804, the Relay-UE forwards the signaling:

the Relay-UE monitors and receives signaling from the Remote-UE and forwards the signaling to the base station, or the Relay-UE monitors and receives signaling from the base station and forwards the signaling to the Remote-UE.

A Fifth Application Example

Figure 9:
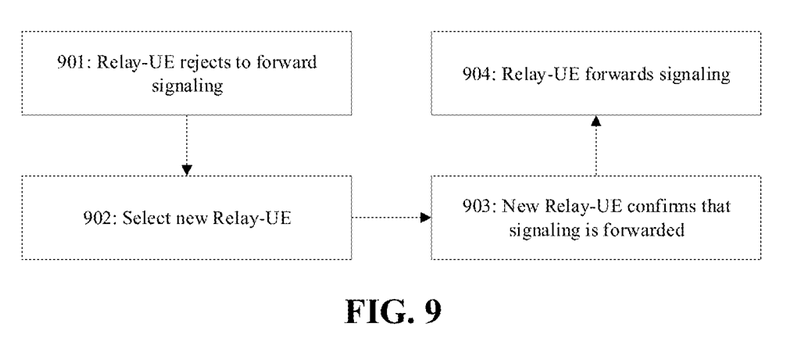
FIG. 9 is a schematic diagram of a signaling forwarding process according to a fifth application example of the present application.

Referring to FIG. 9, a schematic diagram of a signaling forwarding process of a fifth application example of the present application is shown. In this application example, if the Relay-UE rejects to forward the signaling, the Remote-UE or the base station selects a new Relay-UE, and the new Relay-UE performs signaling forwarding process, which specifically includes:

In step 901, the Relay-UE rejects to forward the signaling:

the Relay-UE receives the request message from the base station or the Remote-UE, the Relay-UE rejects to forward the signaling, and sends a rejection response message to the base station or the Remote-UE, and a reason for rejection is indicated in the message, where the reason for rejection includes but not limited to one of: an insufficient memory, a failure, an unknown destination identifier, inability to connect to a destination, or line congestion, etc.

In Step 902, a new Relay-UE is selected:

the new Relay-UE is selected by the Remote-UE or the base station; where the Remote-UE selects the Relay-UE according to one of: a pre-configured rule, or a base station or another network element indication; the base station selects the Relay-UE according to one of: a pre-configured rule, or another network element indication. Where another network element includes one of: an access network element or a core network element.

In step 903, the new Relay-UE confirms that the signaling is forwarded:

when the new Relay-UE is selected, the Remote-UE or the base station sends a request message of requesting forwarding of the signaling to the Relay-UE, when the Relay-UE agrees to forward, and then the Relay-UE sends the confirmation signaling to the Remote-UE or the base station. If the Relay-UE rejects to forward, step 902 may be repeated.

In Step 904, the new Relay-UE forwards the signaling:

The Relay-UE forwards the received signaling to a destination node.

Figure 10:
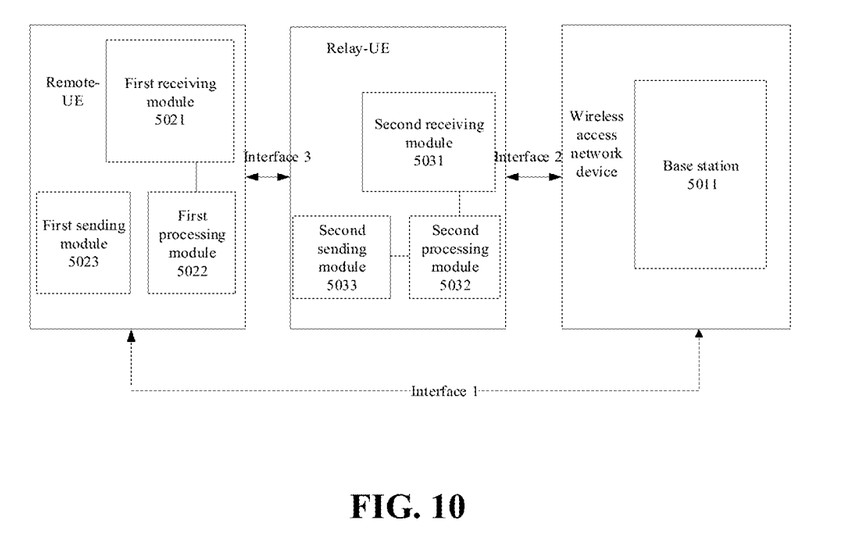
FIG. 10 is a schematic structural diagram of a signaling forwarding system according to an embodiment of the present application.

Referring to FIG. 10, a schematic structural diagram of a signaling forwarding system according to the embodiment of the present application is shown. The present embodiment discloses a system for implementing signaling forwarding, the system includes: a radio access network device, a Remote-UE and a Relay-UE, where the radio access network device includes a base station 5011, the Remote-UE includes a first receiving module 5021, a first processing module 5022 and a first sending module 5023 disposed at a terminal end, the Relay-UE includes a second receiving module 5031, a second processing module 5032 and a second sending module 5033;

the first receiving module 5021 included in the Remote-UE is configured to receive, through an air interface, the control signaling sent by the second sending module 5033 of the Relay-UE, the first processing module 5022 is configured to autonomously select a communication path and the Relay-UE, the first sending module 5023 is configured to send a request message to the second receiving module 5031. The second sending module 5033 is configured to send signaling to the base station 5011 or the first receiving module 5021, the second receiving module 5031 is configured to receive the signaling sent by the base station 5011 or the first sending module 5023, the second processing module 5032 is configured to determine a signaling forwarding mode, and the base station 5011 is configured to receive the signaling sent by the second sending module 5033 and send the signaling to the second receiving module 5031, and also configured to configure the signaling resource.

In a system to which the signaling transmission method of the embodiment of the present application is applied, the Remote-UE device includes at least one of: a UE, Wearables, or an IOT/MTC terminal (such as category M1/category NB-IoT equipment), if no special description is given, the Remote-UE appearing in the present application represents one or more of the foregoing terminal devices, and it should be noted that the present application is applicable to various types of UE.

The Remote-UE is based on the indication information sent by the access network device or autonomously select a signaling transmission path (the air interface link between the Remote-UE and the Relay-UE or the Uu link between the Remote-UE and the access network device), when the Remote-UE transmits the control signaling (refers to the control signaling between the Remote-UE and the access network device here) through a link (hereinafter referred to as a sidelink) between the Remote-UE and the Relay-UE. The Remote-UE establishes a connection with the Relay-UE and transmits and receives the required signaling through the Relay-UE, where the link between the Remote-UE and the Relay-UE may adopt a 3GPP LTE-based transmission technology (such as sidelink) or a Non-3GPP-based transmission technology (such as bluetooth, WLAN, infrared, etc.).

The Relay-UE device includes at least one of: a Relay, or a Relay-UE device which is responsible for forwarding control plane signaling between an access network device and a Remote-UE device, the Relay-UE forwards signaling related to the Remote-UE via a sidelink interface according to indication information of the access network device, or the Relay-UE does not change the contents of the signaling (if no dedicated description is given, the following signaling refers to air interface signaling between the Remote-UE and the access network device), but the Relay-UE changes the form of the signaling, for example the Relay-UE combines multiple signaling into single signaling, or segments single signaling into multiple signaling, or changes periodic signaling into non-periodic signaling, or changes non-periodic signaling into periodic signaling, and so on;

the signaling is one of: signaling of layer 3, signaling of layer 2, or signaling of layer 1;

the Relay-UE is a layer 2 Relay, and the Relay-UE and the Remote-UE are communicated by using at least one of: sidelink, bluetooth, WLAN/WiFi, Infrared Data Association (IrDA), or wireless personal area network (ZigBee).

The access network device at least includes a base station. Where the base station is mainly responsible for sending signaling to the Remote-UE device through the Relay-UE, and receiving the signaling sent by the Remote-UE device through the Relay-UE.

In the embodiment of the present application, Wearables/MTC/NB-IoT equipment (Remote-UE) establishes a connection with a Relay (Relay-UE), and the Relay-UE receives signaling from the base station via the Uu interface, the Relay-UE monitors paging messages related to the Remote-UE, the base station sends a paging message for the Remote-UE to the Relay-UE, the Relay-UE forwards the received paging message to the Remote-UE, the Remote-UE and the Relay-UE establish a sidelink connection, and the Relay-UE and the base station establish a corresponding RRC connection, and therefore, the Remote-UE may communicate with the base station through the Relay-UE.

Figure 11:
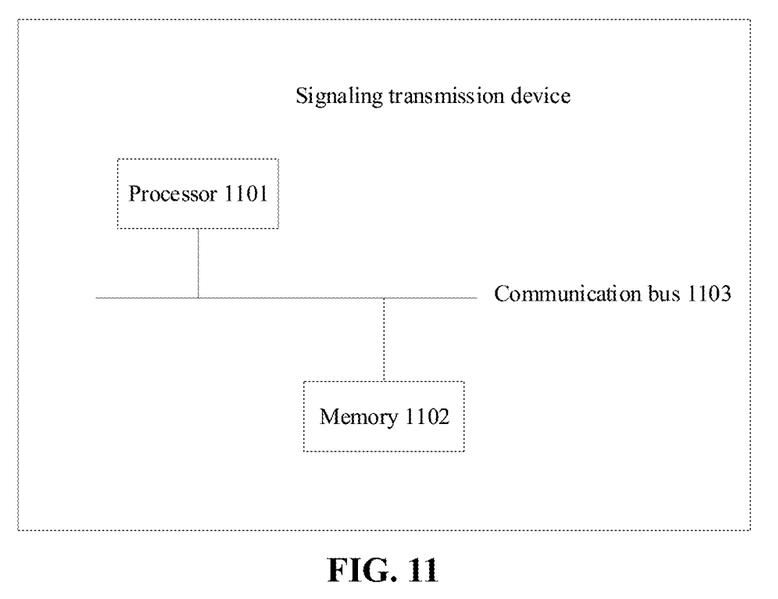
FIG. 11 is a schematic structural diagram of a signaling transmission device according to an embodiment of the present application.

In addition, an embodiment of the present application further provides a signaling transmission device, as shown in FIG. 11, the signaling transmission device includes a processor 1101, a memory 1102 and a communication bus 1103;

a communication bus 1103 configured to implement connection and communication between the processor 1101 and the memory 1102;

the processor 1101 is configured to execute a signaling transmission program stored in the memory 1102 to implement following steps of:

signaling sent by a base station or a Remote-UE is received; and if it is determined that a signaling forwarding condition is satisfied or if a signaling forwarding instruction message sent by the base station is received, the signaling between the Remote-UE and the base station is forwarded.

In addition, the processor is further configured to execute a signaling transmission program stored in the memory, so as to implement other steps in the method according to the embodiment of the present application, which is not described in detail herein.

An embodiment of the present application also provide a computer readable storage medium storing one or more programs, the one or more programs are executable by one or more processors to implement steps of:

signaling sent by a base station or a Remote-UE is received; and if it is determined that a signaling forwarding condition is satisfied or if a signaling forwarding instruction message sent by the base station is received, the signaling between the Remote-UE and the base station is forwarded.

Furthermore, the one or more programs may also be executed by one or more processors to implement other steps in the method of the embodiment of the present application, which is not described in detail herein.

The computer readable storage medium described above includes several instructions for enabling a computer device (which may be a personal computer, a server, or a network device) or a processor to perform some of the steps of the methods described in various embodiments of the present application. And the computer readable storage medium includes various media that may store program codes, such as a U disk, a mobile hard disk, a Read Only Memory (ROM), a Random Access Memory (RAM), a magnetic disk, or an optical disk, etc.

The above-mentioned serial numbers of the embodiments of the present application are merely for description and do not represent advantages or disadvantages of the embodiments. From the above descriptions of the embodiments, it is clear to those skilled in the art that the method of the above embodiments may be implemented by the software plus a necessary general-purpose hardware platform, and of course, may be implemented by the hardware, but in many cases, the former is a more preferred implementation. Based on this understanding, the embodiments of the present application may be embodied in a form of a software product in essence, or parts of the embodiments of the present application may be embodied in a form of a software product. The computer software product is stored in a storage medium (such as a ROM/RAM, a magnetic disk, an optical disk), and includes several instructions for causing a terminal device (which may be a mobile phone, a computer, a server, or a network device, etc.) to execute the method described in various embodiments of the present application.

The above description is of the preferred embodiment of the present application and is not intended to limit the application. Various changes and variations may be made to the present application by those skilled in the art. Any modifications, equivalent substitutions, improvements, etc. made within the spirit and principles of the present application are intended to be included within the scope of the present application.

INDUSTRIAL APPLICABILITY

In the embodiment of the present application, the Remote-UE is communicated with the network or directly communicated with the network through the Relay-UE, and when the Remote-UE is located out of the coverage of the network, the Remote-UE can be ensured to receive the network signaling, and operations related to the network are ensured.

What is claimed is:

1. A signal transmission method, comprising:
   receiving, by a relay user equipment (Relay-UE), signaling sent by a base station or a remote user equipment (Remote-UE); and
   in response to determining that a signal forwarding condition is satisfied or upon receiving a signaling forwarding instruction message sent by the base station through dedicated radio resource control (RRC) signaling, forwarding, by the Relay-UE, the signaling between the Remote-UE and the base station, wherein the Relay-UE is in a RRC-connected state;
   wherein the signaling forwarding instruction message comprises a forwarding resource of the signaling to be forwarded between the Remote-UE and the base station, the forwarding resource is a position of the signaling to be forwarded between the Remote-UE and the base station;
   wherein in a case where a signaling forwarding request message comes from the base station, the position of the forwarding resource of the signaling to be forwarded between the Remote-UE and the base station is indicated by the base station; and
   in a case where the signaling forwarding request message comes from the Remote-UE, the forwarding resource of the signaling to be forwarded between the Remote-UE and the base station is determined in a resource configured by the base station;
   wherein the determination by the Relay-UE that the signaling forwarding condition is satisfied comprises:
   in response to determining that the signaling to be forwarded between the Remote-UE and the base station comes from the base station, the Relay-UE determines that the signaling forwarding condition is satisfied according to a link quality satisfying a preset condition and a pre-configured rule.

2. The method of claim 1, wherein,
   the Remote-UE is located in a coverage of the base station or out of the coverage of the base station.

3. The method of claim 2, wherein in a case where the Remote-UE is located in the coverage of the base station, the base station instructs the Remote-UE to receive, from the base station, the signaling via a Uu interface, or receive, from the Relay-UE and via a sidelink interface, the signaling sent by the base station.

4. The method of claim 1, further comprising:
   determining, by the Relay-UE, signaling contents to be forwarded, wherein the signaling to be forwarded is one of: all of the signaling received by the Relay-UE, or part of the signaling received by the Relay-UE; and
   converting, by the Relay-UE, the signaling received via a Uu interface into signaling suitable for transmission via a sidelink interface, or converting the signaling received via the sidelink interface into signaling suitable for transmission via the Uu interface.

5. The method of claim 1, wherein,
the determination by the Relay-UE that the signal forwarding condition is satisfied further comprises: in response to determining that the signaling comes from the Remote-UE, the Relay-UE determines that the signaling forwarding condition is satisfied according to at least one of following information: a request message of the Remote-UE, a network parameter satisfying a preset condition, a pre-configured rule being satisfied, or reception of access network indication information.

6. The method of claim 5, wherein,
the network parameter comprises a link quality and a quality of service (QoS) requirement; the access network indication information comprises information sent by an access network equipment to the Remote-UE via a system message or dedicated signaling and used for indicating at least one of a communication path or a communication technology, wherein the dedicated signaling comprises at least one of: signaling of layer 1, signaling of layer 2 or signaling of layer 3; the access network indication information further comprises at least one of: communication via at least one of a Uu interface or a sidelink interface, type of service (ToS) of the communication via each of the Uu interface and the sidelink interface, priorities of the Uu interface and the sidelink interface, discovery of the sidelink interface and a communication resource for the side interface, or use of 3GPP or non-3GPP technology for the sidelink interface; wherein the ToS comprises one of: QoS, a control plane service, a user plane service, a uplink or downlink service.

7. The method of claim 1, wherein the Relay-UE is associated with a plurality of Remote-UEs and/or the Remote-UE is associated with a plurality of Relay-UEs, an association relationship between the Remote-UE and the Relay-UE is configured by a higher level, and is delivered to the Remote-UE, the Relay-UE and the base station related to the association relationship in advance.

8. The method of claim 1, further comprising:
in response to determining that a signaling forwarding condition is satisfied, sending, by the Relay-UE, an acknowledgement message to the Remote-UE or the base station,
wherein the acknowledgement message comprises at least one of: a forwarding mode, a forwarding resource or a Remote-UE identifier;
wherein the forwarding mode comprises at least one of: signaling forwarding, a forwarding cycle, merging and forwarding, segmenting and forwarding, complete forwarding, or partial forwarding; the forwarding resource refers to a position for the signaling forwarding; and the Remote-UE identifier is used for indicating the Remote-UE involved in the signaling forwarding.

9. The method of claim 1, wherein forwarding, by the Relay-UE, the signaling between the base station and the Remote-UE comprises:
receiving, by the Relay-UE, the signaling from the Remote-UE via a sidelink interface and forwarding the signaling to the base station via a Uu interface; and/or receiving, by the Relay-UE, the signaling from the base station via the Uu interface and forwarding the signaling to the Remote-UE.

10. The method of claim 9, wherein,
in a case where the Relay-UE receives the signaling from the base station, before forwarding the signaling by the Relay-UE, the method further comprises: informing the Remote-UE of relevant information of signaling forwarding, wherein the relevant information comprises forwarding time and a forwarding resource.

11. The method of claim 1, further comprising:
in response to determining to reject forwarding of the signaling, sending a negative acknowledgement message to the base station or the Remote-UE, wherein the negative acknowledgement message comprises a reason for rejection.

12. The method of claim 11, further comprising:
selecting, by the Remote-UE or the base station, another Relay-UE to forward the signaling, or directly performing signaling interaction between the Remote-UE and the base station, or suspending the signaling interaction between the Remote-UE and the base station.

13. A signaling transmission device, comprising: a processor, a memory and a communication bus, wherein,
the communication bus is configured to implement connection and communication between the processor and the memory;
the processor is configured to execute a signaling transmission program stored in the memory to implement steps of:
receiving signaling sent by a base station or a remote user equipment (Remote-UE); and
in response to determining that a signal forwarding condition is satisfied or upon receiving a signaling forwarding instruction message sent by the base station through dedicated radio resource control (RRC) signaling, forwarding the signaling between the Remote-UE and the base station, wherein the signaling transmission device is in a RRC-connected state;
wherein the signaling forwarding instruction message comprises a forwarding resource of the signaling to be forwarded between the Remote-UE and the base station, the forwarding resource is a position of the signaling to be forwarded to be forwarded between the Remote-UE and the base station;
wherein in a case where a signaling forwarding request message comes from the base station, the position of the forwarding resource of the signaling to be forwarded between the Remote-UE and the base station is indicated by the base station; and
in a case where the signaling forwarding request message comes from the Remote-UE, the forwarding resource of the signaling to be forwarded between the Remote-UE and the base station is determined in a resource configured by the base station;
wherein the determination by the Relay-UE that the signaling forwarding condition is satisfied comprises:
in response to determining that the signaling of the signaling to be forwarded between the Remote-UE and the base station comes from the base station, the Relay-UE determines that the signaling forwarding condition is satisfied according to a link quality satisfying a preset condition and a pre-configured rule.

14. A non-transitory computer readable storage medium storing one or more programs, the programs are executable by one or more processors to implement steps of:
receiving signaling sent by a base station or a remote user equipment (Remote-UE); and in response to determining that a signal forwarding condition is satisfied or upon receiving a signaling forwarding instruction message sent by the base station through dedicated radio resource control (RRC) signaling, forwarding the signaling between the Remote-UE and the base station;

wherein the signaling forwarding instruction message comprises a forwarding resource of the signaling to be forwarded between the Remote-UE and the base station, the forwarding resource is a position of the signaling to be forwarded between the Remote-UE and the base station;

wherein in a case where a signaling forwarding request message comes from the base station, the position of the forwarding resource of the signaling to be forwarded between the Remote-UE and the base station is indicated by the base station; and in a case where the signaling forwarding request message comes from the Remote-UE, the forwarding resource of the signaling to be forwarded between the Remote-UE and the base station is determined in a resource configured by the base station;

wherein the determination by the Relay-UE that the signaling forwarding condition is satisfied comprises:

in response to determining that the signaling comes from the base station, the Relay-UE determines that the signaling forwarding condition is satisfied according to a link quality satisfying a preset condition and a preconfigured rule.

* * * * *